J. A. WELCH.
ENGINE PISTON.
APPLICATION FILED JULY 7, 1920.
1,377,106.
Patented May 3, 1921.
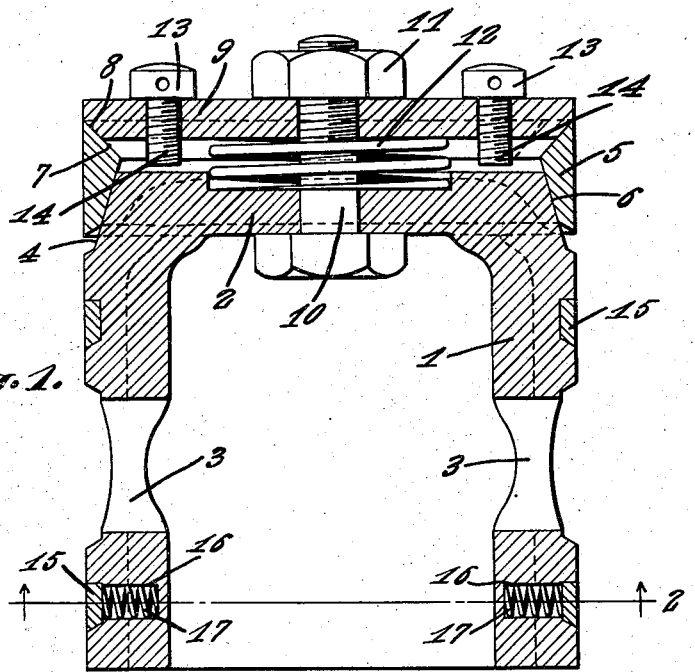
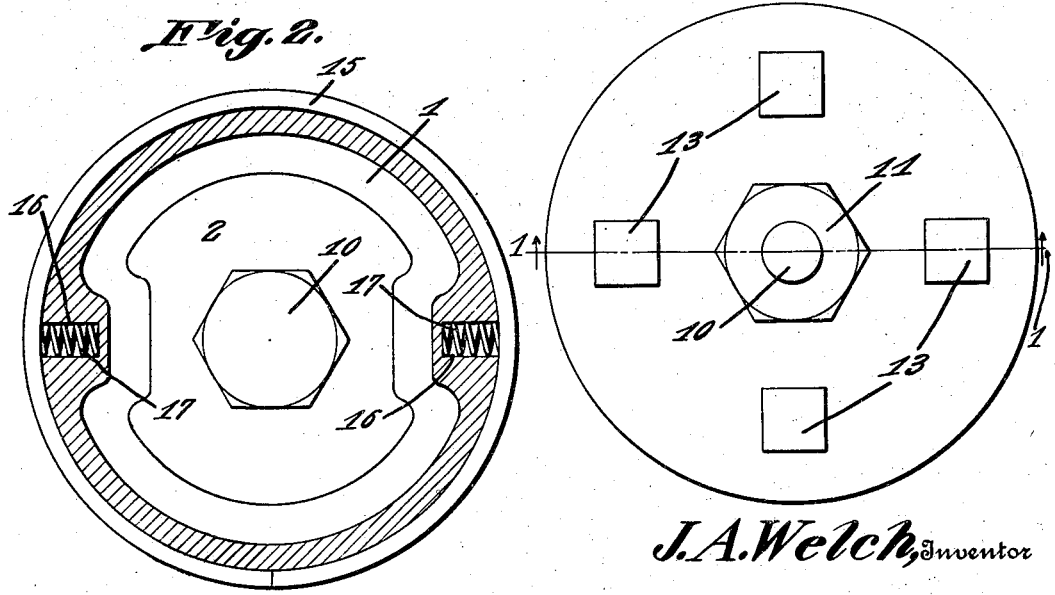
J. A. Welch, Inventor
Witness
By C. A. Snow & Co.
Attorneys

UNITED STATES PATENT OFFICE.

JOHN A. WELCH, OF KANSAS CITY, MISSOURI.

ENGINE-PISTON.

1,377,106.　　　　　Specification of Letters Patent.　　Patented May 3, 1921.

Application filed July 7, 1920. Serial No. 394,463.

*To all whom it may concern:*

Be it known that I, JOHN A. WELCH, a citizen of the United States, residing at Kansas City, in the county of Jackson and State of Missouri, have invented a new and useful Engine-Piston, of which the following is a specification.

This invention relates to a piston especially designed for use in connection with internal combustion engines, one of its objects being to provide a piston having a head normally spaced from the body of the piston and which, during each power stroke of the piston operates to slightly expand a packing ring carried by the piston, thereby maintaining a tight joint and preventing leakage.

A still further object is to provide yielding means for returning the piston head automatically to its normal position after each power stroke, there being additional means for adjusting the piston head to compensate for wear upon the piston ring and the cylinder wall.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a central longitudinal section through the piston.

Fig. 2 is a section on line 2—2, Fig. 1.

Fig. 3 is a plan view of the piston.

Referring to the figures by characters of reference 1 designates a hollow piston closed at one end, as indicated at 2 while formed in the wall of the piston at diametrically opposed points are openings 3 adapted to receive the pin of the connecting rod not shown. The closed end portion of the piston has its periphery beveled as indicated at 4 and surrounding this beveled end portion is a piston ring 5 preferably formed of a material softer than the engine cylinder and having its inner surface beveled or flared as at 6 so as to fit snugly upon the beveled portion 4 of the piston.

That portion of the ring 5 projecting beyond the end of the piston has its inner wall flared as at 7 to form a seat for the beveled periphery 8 of a movable piston head or cap 9 which is connected to the piston 1 by a bolt 10 extending through the centers of the cap 9 and the closed end of the piston. A nut 11 engaging the bolt prevents the cap or head 9 from being accidentally disconnected and a coiled spring 12 interposed between the piston and the cap serves to hold said cap normally pressed against the nut 11. The heads 13 of a series of adjusting screws 14 are arranged beyond the cap, these screws being threaded through the cap and forming stops for shutting against the piston. The cap or head 9 is adapted to slide along these screws and said screws are adjustably mounted in the piston.

Piston rings 15 extend around the piston 1 with the openings 3 between them and for the purpose of holding one of the rings 15 properly in contact with the cylinder wall at points in line with the openings 3, sockets 16 are formed in the piston at diametrically opposed points and in longitudinal alinement with the centers of the openings 3. Springs 17 are seated in these sockets and thrust outwardly against the ring 15 which extends across the outer ends of the sockets.

It will be understood that, during each power stroke of the piston, the pressure of the exploded fuel will be against the cap or head 9 which will thrust, through the ring 5, against the piston 1, this movement being limited by the adjustable bolts 14. As the cap or head 9 is beveled it will exert a wedging action upon the ring and tend to expand it so as to properly seal the points of contact between the ring and cylinder. Expansion of the ring will also be caused by the beveled end of the piston 1. After each power stroke the spring 12 will shift the cap or head 9 back against the nut 11 and should the ring 5 become worn so that considerable play occurs between the parts, the wear can be compensated for by giving a sufficient number of turns to the nut 11. By removing the cap 9 a new ring can be easily placed in position.

What is claimed is:

1. The combination with a piston having a beveled end portion, and a central recess in said end portion, of a cap having a beveled periphery, a spring seated in the recess and bearing against the cap, means connecting the piston and the cap for holding the cap centered, said cap being shiftable against the action of the spring and relative to the piston, the beveled portions of the cap and piston coöperating to form an annular tapered seat, an expansible piston ring engaging said seat, and adjustable means carried by the cap for engagement with the piston to limit the movement of the cap in one direction relative to the piston.

2. The combination with a piston having one end portion beveled, and a central recess within said end portion of the piston, of a cap having a beveled periphery, a spring seated within the recess and bearing against the cap to hold the cap normally spaced from the piston, a central connecting member engaging the piston and cap for limiting the movement of the cap away from the piston under the action of the spring and for guiding the cap in its movement toward the piston, adjustable means carrried by the cap and movable against the piston to limit the movement of the cap toward the piston, and an expansible piston ring engaging the beveled portions of the piston and cap and expansible by the movement of the cap toward the piston.

In testimony that I claim the foregoing as my own, I have hereto affixed my signature in the presence of two witnesses.

JOHN A. WELCH.

Witnesses:
C. A. WALKER,
JOHN E. MCMILLAN.